United States Patent [19]
Caplan et al.

[11] Patent Number: 6,061,189
[45] Date of Patent: *May 9, 2000

[54] THROUGH-THE-LENS BINOCULAR VIEWER

[75] Inventors: Charles Howard Caplan, Middleton, Wis.; Richard A. Buchroeder, Tucson, Ariz.

[73] Assignee: Surgical Acuity, Inc., Madison, Wis.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/583,279

[22] Filed: Jan. 5, 1996

Related U.S. Application Data

[63] Continuation-in-part of application No. 08/479,962, Jun. 7, 1995, Pat. No. 5,627,690, which is a continuation of application No. 08/114,870, Aug. 31, 1993, Pat. No. 5,463,500.

[51] Int. Cl.$^7$ .......................... G02B 13/00; G02B 23/00
[52] U.S. Cl. ..................... 359/744; 359/362; 359/399; 351/158
[58] Field of Search ................. 359/362, 367, 359/399, 404, 407, 503–506, 642–643, 647, 744, 793, 795; 357/41, 158, 205

[56] References Cited

U.S. PATENT DOCUMENTS

| | | | |
|---|---|---|---|
| 1,197,742 | 9/1916 | Kellner | 359/744 |
| 3,273,456 | 9/1966 | Feinbloom | 359/481 |
| 4,364,645 | 12/1982 | Feinbloom | 351/204 |
| 4,498,743 | 2/1985 | Feinbloom | 351/45 |
| 4,555,164 | 11/1985 | Feinbloom | 359/670 |
| 4,621,283 | 11/1986 | Feinbloom | 348/77 |
| 4,863,468 | 9/1989 | Feinbloom et al. | 623/6 |
| 4,865,438 | 9/1989 | Wada | 351/158 |
| 4,929,075 | 5/1990 | Eliakim | 351/158 |
| 5,076,682 | 12/1991 | Pasfield | 351/158 |
| 5,090,796 | 2/1992 | Feinbloom | 351/158 |
| 5,129,717 | 7/1992 | Feinbloom | 351/158 |
| 5,278,695 | 1/1994 | Gebelein et al. | 359/419 |
| 5,291,229 | 3/1994 | Feinbloom | 351/57 |
| 5,463,500 | 10/1995 | Buchroeder | 359/362 |
| 5,627,690 | 5/1997 | Caplan et al. | 359/362 |

FOREIGN PATENT DOCUMENTS

| | | | |
|---|---|---|---|
| 561572 | 10/1932 | Germany | 359/744 |
| 501696 | 1/1934 | Germany | 359/744 |

*Primary Examiner*—Thong Nguyen
*Attorney, Agent, or Firm*—Fitch, Even, Tabin & Flannery

[57] ABSTRACT

A magnification viewer system includes a pair of magnification viewers adapted to be inserted into apertures in a pair of spectacle lenses to provide a relatively wider field of view and a lighter viewer system. Each magnification viewer includes a two-element objective lens and a single-element eyepiece lens. The doublet objective lens serves to reduce vignetting while providing a wide field of view and reduced chromatic aberration. Image quality may be further enhanced while keeping the weight of the viewer down through the use of light-weight high index glass for the objective lens. Moreover, the invention permits the use of interchangeable eyepiece lenses to provide a series of working distances, as well as interchangeable eyepiece segments to enable the magnification viewers to be corrected to the user's ophthalmic prescription. In order to reduce the criticality of the interpupillary distance, eyepiece lenses are formed with a 16 millimeter (mm) diameter.

11 Claims, 3 Drawing Sheets

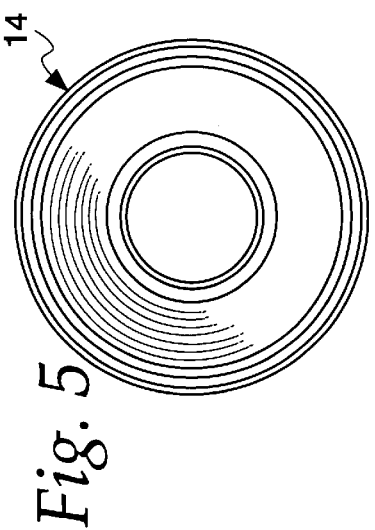
Fig. 1 PRIORART
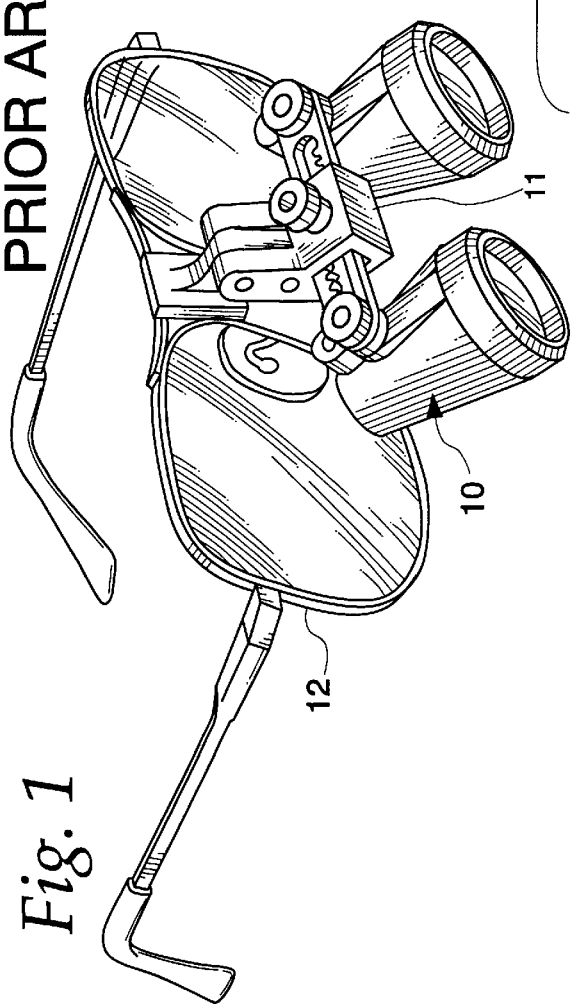
Fig. 5
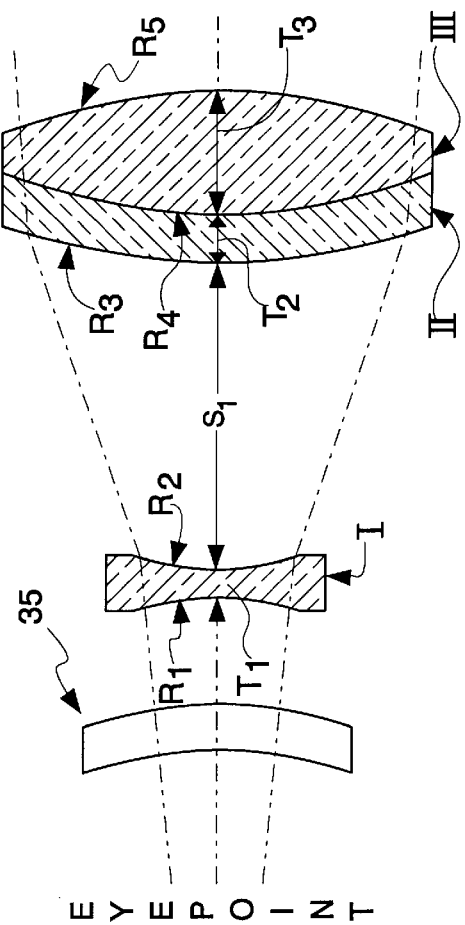
Fig. 3
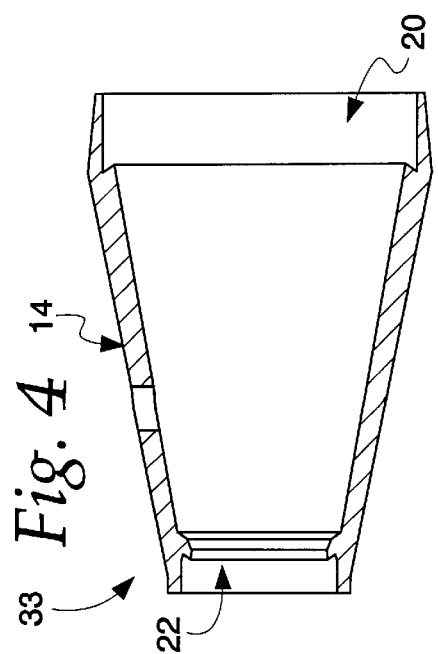
Fig. 4

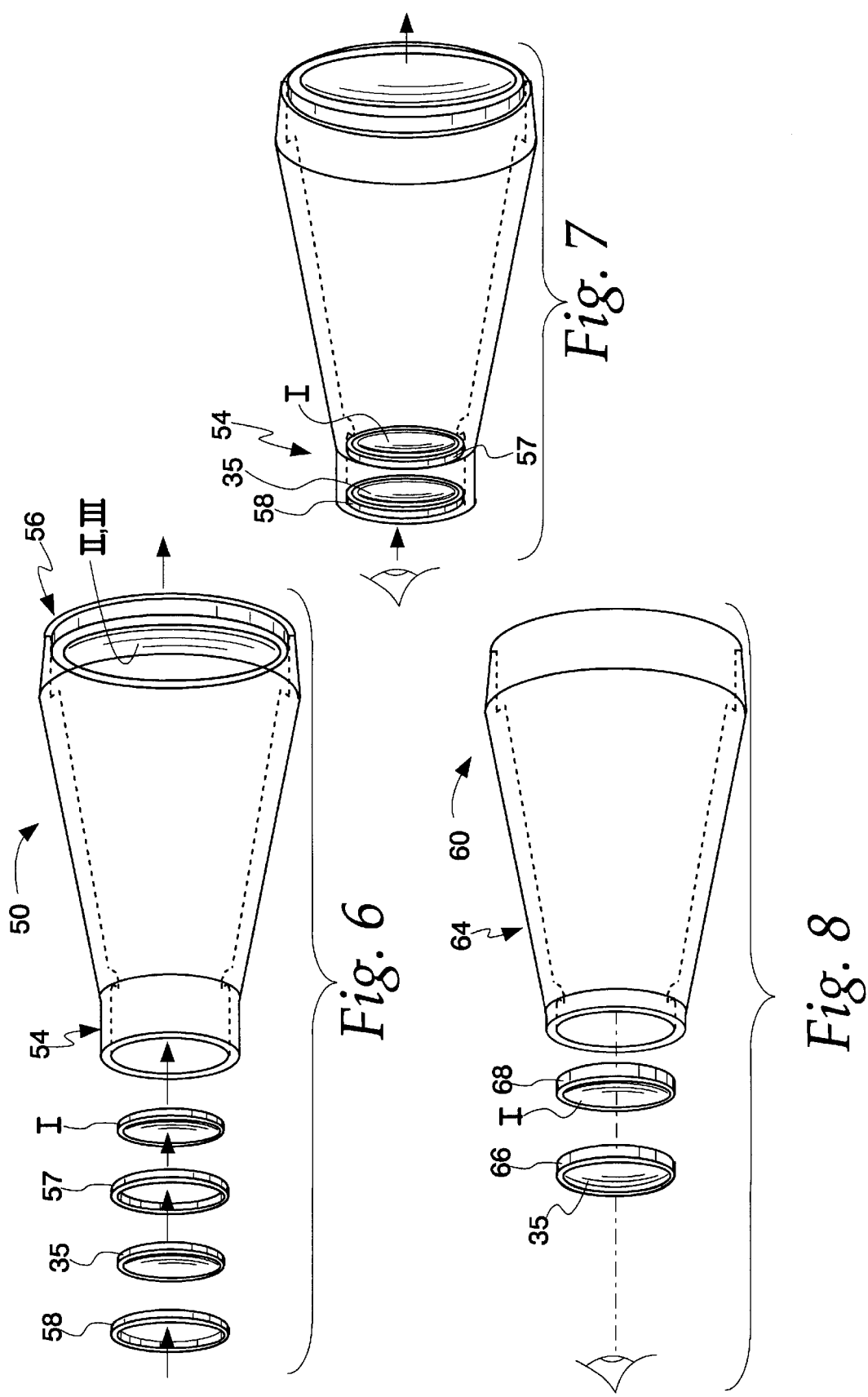

THROUGH-THE-LENS BINOCULAR VIEWER

CROSS-REFERENCE TO RELATED APPLICATIONS

This application is a continuation-in-part of U.S. patent application Ser. No. 08/479,962, filed Jun. 7, 1995, now U.S. Pat. No. 5,627, 690, which is a continuation of U.S. patent application Ser. No. 08/114,870, filed Aug. 31, 1993 entitled, "Light-Weight Three-Element Clinical Viewer.", now U.S. Pat. No. 5,463,500. This application is also related to U.S. patent application Ser. No. 08/482,647, now abandoned, which is a Division of U.S. patent application Ser. No. 08/114,870. This application is also related to U.S. patent application Ser. No. 08/480,263, filed Jun. 7, 1995, now U.S. Pat. No. 5,790,323 which is a continuation of U.S. patent application Ser. No. 08/115,166, filed Aug. 31, 1993 entitled, "Light-Weight High Magnification Clinical Viewer.", now U.S. Pat. No. 5,515,209.

BACKGROUND OF THE INVENTION

1. Field of the Invention

The present invention relates to a magnification viewer system or loupe known to be worn by surgeons and dentists during certain clinical procedures. In particular, the invention relates to a compact, light-weight, comfortable-to-wear magnification viewer, adapted to be carried by spectacles forming a magnification viewer system. The magnification viewer system provides a relatively wide field of view and good image quality, which minimizes the criticality of the interpupillary distance which, in turn, simplifies adjustment and minimizes reworking of the magnification viewer system.

2. Description of the Prior Art

Magnification viewers are worn by dentists and surgeons for extended periods of time during clinical procedures to provide clarity of view while to avoid a "hunched over" position that can result in debilitating neck and back strain, which can have an adverse effect on the success of the operation. Higher magnification viewers permit the clinician to operate at a greater working distance from the patient. Because clinicians use magnification viewers during surgery and other procedures that require precision, it is important that the viewers be light-weight and comfortable to wear while providing good clarity and a relatively wide field of vision at a relatively high magnification level.

Prior art magnification viewer systems as shown in FIG. 1 are known to employ a pair of magnification viewers 10 attached to a frame of a pair of spectacles 12 by way of a binocular frame 11. The binocular frame 11 provides added weight and complexity to the magnification viewer system, thereby increasing the strain and discomfort to the wearer.

Magnification viewer systems are also known which do not use a binocular frame. In such systems, the magnification viewers are carried by spectacle lenses. One at such viewer is disclosed in Feinbloom, U.S. Pat. No. 3,273,456 ("the '456 patent"). Other systems which involve drilling a hole through a spectacle lens, such as Feinbloom, U.S. Pat. No. 4,364,645; Feinbloom, U.S. Pat. No. 4,555,164; Feinbloom, et al., U.S. Pat. No. 4,863,468; Feinbloom, U.S. Pat. No. 5,129,717; and Feinbloom, U.S. Pat. No. 5,291,229. However, in such magnification viewer systems, the interpupillary distances for the eyepieces are known to be relatively critical, resulting in relatively difficult alignment of the optical system and a significant amount of rework. As such, relatively complicated systems have been developed, such as disclosed in U.S. Pat. Nos. 4,364,645 and 5,090,796, which involve irregularly shaped apertures in the spectacle lenses to which the viewers are inserted to allow for adjustment of the interpupillary distance. Such systems are relatively more complicated and also more expensive.

Known magnification viewer systems are also known to be made according to the Galilean telescope design having a single objective lens and a single eyepiece lens. Galilean telescopes are characterized by relatively narrow fields of view, mainly limited by the diameter of the objective lens. However, the basic Galilean design is known to produce substantial chromatic aberration ("coloring") and hence poor image quality.

It is known that the magnification, or power, of a Galilean design is proportional to the focal length of the objective lens and inversely proportional to the focal length of the eyepiece lens. Thus, the overall viewer length is proportional to the sum of the focal lengths of the objective and eyepiece. Since the dimensions of the viewer should be kept as short as possible to reduce torque on the nose in order to minimize wearer discomfort, an eyepiece with a shorter focal length is usually employed when an increase in magnification is desired. However, in order to retain a good field of view without vignetting, the diameter of the objective lens must be increased. If the diameter of the objective lens is kept the same while keeping the focal length of the objective the same, the "speed" of the lens increases, which results in a lower resolution quality as well as a relatively larger package. One method of overcoming the "speed" problem is to use a more complicated objective lens, which increases the weight and thus strain and discomfort to the wearer, as well as complicating the manufacturing of such a viewer, which increases its cost.

The so-called Kellner design (disclosed in U.S. Pat. No. 1,197,742), known to be used for such magnification viewer systems, contains a relatively heavy doublet or two-piece objective lens and a single eyepiece lens. While the image quality is adequate at lower magnifications, at higher magnifications, excessive coloring results in poor image quality. Moreover, the field of view is relatively limited.

Magnification viewer systems are also known to employ asymmetrical eyepiece lenses having differing radii of curvature on each side lens to ensure that the eyepiece is inserted with the appropriate surface facing outwardly. Such a configuration results in a relatively more complex manufacturing process and relatively high manufacturing costs.

SUMMARY OF THE INVENTION

It is an object of the present invention to provide a compact, high-resolution, high-magnification viewer system with a relatively wide field of view that is comfortable to wear over extended periods of time.

It is another object of the present invention to provide a magnification viewer system in which the interpupillary distance is not as critical as known magnification viewers.

It is a further object of the present invention to provide a magnification viewer system having relatively better color quality than prior art magnification viewers.

It is a further object of the invention to provide a magnification viewer having a relatively wide field of view at high magnification levels.

It is yet a further object of the invention to provide a magnification viewer system for use with spectacles in which the interpupillary distance is significantly less critical than known systems.

It is another object of the invention to provide a method for making a magnification viewer system with interchangeable eyepiece lenses which provide for a plurality of working distances with a single assembly while keeping the objective lens the same.

It is yet another object of the present invention to provide a magnification viewer system which includes interchangeable spectacle segments which enable the system to be corrected to the users ophthalmic prescription.

Briefly, the magnification viewer system in accordance with the present invention, includes a pair of magnification viewers adapted to be inserted into apertures in a pair of spectacle lenses to provide a relatively wider field of view and a lighter viewer system. Each magnification viewer includes a two-element objective lens and a single-element eyepiece lens. The doublet objective lens serves to reduce vignetting while providing a wide field of view and reduced chromatic aberration. Image quality may be further enhanced while keeping the weight of the viewer down through the use of light-weight high index glass for the objective lens. Moreover, the invention permits the use of interchangeable eyepiece lenses to provide a series of working distances. In order to reduce the criticality of the interpupillary distance, eyepiece lenses are formed with a 16 millimeter (mm) diameter. The magnification viewers allow for interchangeable eyepieces which enable the magnification viewer to be used for a plurality of working distances. In addition, the magnification viewer also allows for interchangeable spectacle segments which enable the viewers to be corrected to the user's ophthalmic prescription.

BRIEF DESCRIPTION OF THE DRAWINGS

These and other objects of the present invention will be readily understood upon consideration of the following detailed description and attached magnification drawing, wherein:

FIG. 1 is a perspective drawing of a prior art viewer system illustrating a pair of magnification viewers attached to a pair of spectacles;

FIG. 3 is an optical schematic diagram illustrating the magnification viewer with a two element objective lens and a single element eyepiece lens;

FIG. 4 is a sectional view of one embodiment of a magnification viewer in accordance with the present invention;

FIG. 5 is an end view of the magnification viewer illustrated in FIG. 4;

FIG. 6 is an exploded perspective view of an alternate embodiment of a magnification viewer in accordance with the present invention;

FIG. 7 is a perspective view of the magnification viewer illustrated in FIG. 6, shown assembled; and FIG. 8 is an exploded perspective of another alternate embodiment of the magnification viewer in accordance with the present invention.

DETAILED DESCRIPTION OF THE INVENTION

Figure 2:
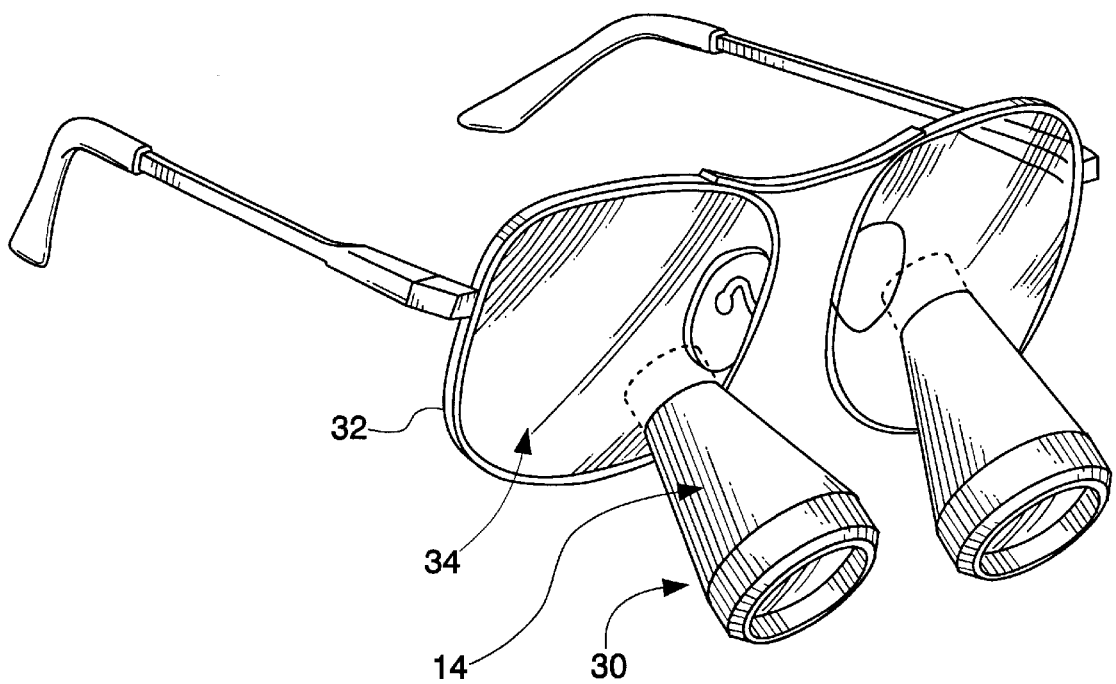
FIG. 2 is a perspective drawing of a magnification viewer system in accordance with the present invention which includes a pair of magnification viewers carried by a pair of spectacles.

Three embodiments of the magnification viewers 30, 50 and 60 (FIGS. 2, 4 and 6–8) in accordance with the present invention are illustrated and described. In each embodiment, the magnification viewers are adapted to be carried by a pair of spectacles as described below and illustrated in FIG. 2 to form a magnification viewer system. More particularly, with reference to FIG. 2, the magnification viewers 30, 50, 60 (FIGS. 2, 4, 6–8), in accordance with the present invention, are adapted to be attached or, alternatively, inserted into a generally circular aperture (not shown), formed in a pair of spectacles lenses 34, which, in turn, are carried by a pair of spectacles or eyeglasses 32. A barrel portion 14, 54, 64 (FIGS. 4, 6–8) of the magnification viewers 30, 50, 60 may be attached at the surface of the spectacle lens 34 by any known means, such as an adhesive or epoxy or interlocking perforations or cooperative threading in spectacle lens 34. Alternatively, as mentioned above, the magnification viewers 30, 50, 60 can be inserted into generally circular apertures in the lens 34. Insertion of the magnification viewers 30 into the apertures in the spectacle lenses 34 improves the field of view of the viewers by moving the viewer closer to the eye. Furthermore, use of the spectacle lenses results in less weight and hence, less strain on the user.

The optical system for the magnification viewers system 30, 50, 60 is shown in FIG. 3. The magnification viewers 30, 50, 60, according to the invention, each include a single-element eyepiece lens including element I and a two element objective lens including elements II–III. As used herein and as illustrated in FIG. 3, R1, R2, etc. represent the radii of curvature of the respective refractive surfaces; $S_1$ represents the thickness of the air space; and $T_1$, $T_2$ etc. represent the thicknesses of the lens elements.

The magnification viewers 30, 50, 60 may contain a vision corrective spectacle segment 35 (FIG. 3), disposed adjacent to the eyepiece lens I. For systems in which the magnification viewers are inserted into apertures in the spectacle lenses 34, a spectacle segment 35 may be positioned at an arbitrary, but close distance relative to the eyepiece I in order to correct the user's individual ophthalmic prescription.

The magnification viewer system 30, 50, 60 may alternatively be configured with a single eyepiece and a single objective lens. However, with such a configuration, chromatic aberrations would result in poor image quality. Thus, the magnification viewers 30, 50, 60 are preferably configured with a doublet objective lens, as in the Kellner system. However, the Kellner system provides relatively poor image quality. In order to improve the image quality, a selectively high index flint glass may be used for element II of the objective lens, such as Schott Optical Glass Company type SF6 which has a specific gravity of 5.18 grams per cubic centimeter. However, such flint glass has not been known to be used since the use of very high index flint glass, coupled with a greater number of lens elements, increases the weight of the viewer which could be used.

In order to improve image quality while maintaining a comfortable weight for the magnification viewers 30, 50, 60, a light-weight high index glass is used for the objective lens in accordance with the present invention. Such light-weight high-index glass is available from various manufacturers, such as Schott and Ohara (e.g., Scott type SFL6, which has a specific gravity of only 3.37 grams per cubic centimeter). The resulting doublet lens is reduced in weight while providing reduced aberrations and higher image quality. The doublet lens II, as well as the lens III, may also be made from type SK2 glass, while the eyepiece lens I may be made from type BK7 glass.

An important aspect of the invention relates to the working distance of the magnification viewers 30, 50 and 60. In particular, it is known that the radii of curvature for the various lens elements used in the doublet objective lens are kept the same for different working distances. Thus, to change the working distance of the magnification viewers (30, 50, 60), the radii of curvature of the eyepiece, lens element I is changed as discussed in more detail below. Such a change generally results in an asymmetrically curved eyepiece lens, which is more expensive to manufacture. Such a change further requires attention to which surface of the eyepiece lens I is inserted facing the objective lens. In order to reduce manufacturing costs, a method in accordance with one aspect of the present invention is disclosed in which lens element I is formed with equiconcave surfaces. By utilizing an equiconcave eyepiece lens, either surface of the eyepiece lens can face the objective lens.

In the first embodiment of the invention, the lenses I, II and III are housed in a barrel portion 14 of the magnification viewer 30. In particular, the objective lenses (II and III) are mounted in one end 20 of the mounting barrel 14 while the eyepiece lens I is mounted at the opposite end 22. In the embodiment illustrated in FIG. 4, the lenses I, II and III may be secured to the barrel portion by any known means, for example, by heat staking, to enable the eyepiece lens I and/or a spectacle segment 35 to be removed and replaced. By using an equiconcave eyepiece lens I, either surface of the eyepiece lens I may face the objective lens II. As mentioned above, if required, the spectacle segment 35 may be attached to or inserted into the eyepiece portion 33 (FIG. 4) of the barrel portion 14 to correct to the user's ophthalmic prescription.

Exemplary construction data for the magnification viewer 30, according to the embodiment shown in FIG. 4, is provided in Tables 1–3. These Tables illustrate an important aspect of the invention; namely, the ability of the working distance of the magnification viewers 30, 50, 60 to be changed, while maintaining the same magnification (e.g. 2.2x) by merely changing eyepiece lens I.

TABLE 1

Viewer With Exemplary Standard Working Distance

| Element | $n_d$ | $v_d$ | Radius | Thickness | Separation |
|---------|-------|-------|--------|-----------|------------|
| I | 1.517 | 64.2 | $R_1 = 28.12$ | $T_1 = 1.5$ | $S_1 = 13.97$ |
|   |       |      | $R_2 = 28.12$ |             |               |
| II | 1.805 | 25.4 | $R_3 = 121.40$ | $T_2 = 1.5$ |             |
|   |       |      | $R_4 = 49.28$ |             |               |
| III | 1.607 | 56.7 | $R_4 = 49.28$ | $T_3 = 5.8$ |             |
|   |       |      | $R_5 = 27.50$ |             |               |

TABLE 2

Viewer With Exemplary Long Working Distance

| Element | $n_d$ | $v_d$ | Radius | Thickness | Separation |
|---------|-------|-------|--------|-----------|------------|
| I | 1.517 | 64.2 | $R_1 = 27.30$ | $T_1 = 1.5$ | $S_1 = 13.97$ |
|   |       |      | $R_2 = 27.30$ |             |               |
| II | 1.805 | 25.4 | $R_3 = 121.40$ | $T_2 = 1.5$ |             |
|   |       |      | $R_4 = 49.28$ |             |               |
| III | 1.607 | 56.7 | $R_4 = 49.28$ | $T_3 = 5.8$ |             |
|   |       |      | $R_5 = 27.50$ |             |               |

TABLE 3

Viewer With Exemplary Extra Long Working Distance

| Element | $n_d$ | $v_d$ | Radius | Thickness | Separation |
|---------|-------|-------|--------|-----------|------------|
| I | 1.517 | 64.2 | $R_1 = 26.61$ | $T_1 = 1.5$ | $S_1 = 13.97$ |
|   |       |      | $R_2 = 26.61$ |             |               |
| II | 1.805 | 25.4 | $R_3 = 121.40$ | $T_2 = 1.5$ |             |
|   |       |      | $R_4 = 49.28$ |             |               |
| III | 1.607 | 56.7 | $R_4 = 49.28$ | $T_3 = 5.8$ |             |
|   |       |      | $R_5 = 27.50$ |             |               |

With respect to the Tables, the radius, thickness, and separation dimensions are given in millimeters. Roman numeral I identifies the single element of the eyepiece lens and the Roman numerals II and II identify the lens elements of the two-element object lens from the eyepoint side to the object side; $n_d$ represents the refractive index of each element; $V_d$ is the Abbe dispersion number; $R_1$, $R_2$, etc., represent the radii of curvature of the respective refractive surfaces, in order, from the eyepoint side to the object side; $T_1$, and $S_1$ etc., represent the thicknesses of the lens elements and air spaces, respectively, from the eyepoint side to the objective side, $T_1$, being the thickness of the first element I and $S_1$ being the thickness of the airspace between I and II. The thicknesses $T_1$, and $S_1$ etc. are measured along the optical centerline.

In order to reduce the criticality of the interpupillary distance, an eyepiece lens I is selected with a relatively large diameter (e.g. 16 mm)compared to known magnification viewers, known to utilize an eyepiece lens having a diameter of about 8 mm or less. By utilizing a larger diameter eyepiece lens, the interpupillary distance becomes less critical, thus simplifying adjustment and reducing rework and enabling the spacing between the magnification viewers 30 to accommodate relatively more people than magnification viewers which utilize eyepiece lenses having diameters of 8 mm or less. The objective lenses II and III may be formed with an outside diameter of 24 mm defining a ratio of the diameter of the eyepiece lens/diameter of objective lens=⅔.

As discussed above, an important aspect of the invention relates to the interchangeability of the eyepiece lens I and/or the spectacle segment 35. FIGS. 6 and 7 as well as FIG. 8 illustrate alternate embodiments of the invention which enable relatively quick and easy interchanging of the eyepiece lens I and/or the spectacle lens, to enable different working distances as illustrated in Tables I–III or enable the ophthalmic prescriptions to be changed.

Referring first to FIGS. 6 and 7, the magnification viewer 50 is illustrated with a barrel portion 54 and a frusto-conical position 56. The eyepiece lens I is carried by an eyepiece retainer/spacer 57 while the spectacle segment 35 is carried by a spectacle segment retainer 58. The eyepiece lens I is inserted into the eyepiece retainer/spacer 57 and inserted into the barrel portion 54 as shown in FIG. 7. Similarly, the spectacle segment 35 is inserted into the spectacle segment retainer 58 and inserted into the barrel portion 54 as also shown in FIG. 7. As shown, the eyepiece lens I is preferably inserted into the barrel portion 54 before the spectacle lens segment. Such a configuration facilitates changing of the spectacle segment 35 as well as provides protection from dirt and scratches of the eyepiece lens I.

The retainers 57 and 58 can be secured to the barrel portion 54 by various methods. For example, the barrel portion 54 and the retainers can be threaded. Alternatively, the retainers 57 and 58 can be formed with a groove or ridge which is adapted to be secured relative to a complementary groove or ridge formed in the barrel portion. The retainers 57 and 58 could also be friction fitted relative to the barrel portion 14. Alternatively, the barrel portion 54 could be formed with, for example, heat stakes, which would enable the eyepiece lens I, as well as the spectacle lens 35 to be directly inserted into the barrel portion 54 without the use of the retainers. All of such configurations are considered to be within the broad scope of the invention.

FIG. 8 illustrates another alternate embodiment of the magnification viewer 60. In this embodiment, the barrel portion 64 is formed, in part, by a spectacle segment retainer 66 and an eyepiece segment retainer 68 having the same outside diameter as the barrel portion 64. The retainers 66 and 68 may be secured together and to the barrel portion 64 by any of the methods discussed above.

Obviously, many modifications and variations of the present invention are possible in light of the above teachings. Thus, it is to be understood that, within the scope of the appended claims, the invention may be practiced otherwise than as specifically described above.

What is claimed and desired to be secured by letters patent of the united states:

We claim:

1. A magnification viewer system adapted to be carried by a pair of spectacles including one or more spectacle lenses, comprising:

one or more magnification viewers, each viewer having an eyepiece lens and a doublet objective lens carried by a mounting barrel, said mounting barrel attachable at an eyepiece end to said one or more spectacle lenses;

wherein the viewer has the design parameters represented in the following table:

| Element | $n_d$ | $v_d$ | Radius | Thickness | Separation |
|---|---|---|---|---|---|
| I | 1.517 | 64.2 | $R_1 = 28.12$<br>$R_2 = 28.12$ | $T_1 = 1.5$ | $S_1 = 13.97$ |
| II | 1.805 | 25.4 | $R_3 = 121.40$<br>$R_4 = 49.28$ | $T_2 = 1.5$ | |
| III | 1.607 | 56.7 | $R_4 = 49.28$<br>$R_5 = 27.50$ | $T_3 = 5.8$ | | wherein the Roman numerals I identifies the lens element of a single element eyepiece lens and the Roman numerals II and III identify two lens elements of an objective lens, from eyepoint side to object side; nd represents the refractive index of each element; $v_d$ is the Abbe dispersion number; R1–R5 represent the radii, in millimeters, of respective refractive surfaces, in order, from the eyepoint side to the object side; T1–T3 and S1 represent the thicknesses, in millimeters, of the lens elements and air spaces, respectively, from the eyepoint side to the object side measured along an optical centerline.

2. A magnification viewer having the design parameters represented in the following table:

| Element | $n_d$ | $v_d$ | Radius | Thickness | Separation |
|---|---|---|---|---|---|
| I | 1.517 | 64.2 | $R_1 = 27.30$<br>$R_2 = 27.30$ | $T_1 = 1.5$ | $S_1 = 13.97$ |
| II | 1.805 | 25.4 | $R_3 = 121.40$<br>$R_4 = 49.28$ | $T_2 = 1.5$ | |
| III | 1.607 | 64.2 | $R_4 = 49.28$<br>$R_5 = 27.50$ | $T_3 = 5.8$ | | wherein the Roman numerals I–III identify respective lens elements of an eyepiece lens and an objective lens, from eyepoint side to objective side; $n_d$ represents the refractive index of each element; $V_d$ is the Abbe dispersion number; $R_1$–$R_5$ represent the radii, in millimeters, of the respective refractive surfaces, in order, from the eyepoint side to the object side; $T_1$–$T_3$ and $S_1$ represent the thicknesses, in millimeters, of the lens elements and air spaces, respectively, from the eyepoint side to the object side measured along an optical centerline.

3. A magnification viewer having the design parameters represented in the following table:

| Element | $n_d$ | $v_d$ | Radius | Thickness | Separation |
|---|---|---|---|---|---|
| I | 1.517 | 64.2 | $R_1 = 26.61$<br>$R_2 = 26.61$ | $T_1 = 1.5$ | $S_1 = 13.97$ |
| II | 1.805 | 25.4 | $R_3 = 121.40$<br>$R_4 = 49.28$ | $T_2 = 1.5$ | |
| III | 1.607 | 56.7 | $R_4 = 49.28$<br>$R_5 = 27.50$ | $T_3 = 5.8$ | | wherein the Roman numerals I–III identify respective lens elements of an eyepiece lens and an objective lens, from eyepoint side to objective side; $n_d$ represents the refractive index of each element; $v_d$ is the Abbe dispersion number; $R_1$–$R_5$ represent the radii, in millimeters, of the respective refractive surfaces, in order, from the eyepoint side to the object side; $T_1$–$T_3$ and $S_1$ represent the thicknesses, in millimeters, of the lens elements and air spaces, respectively, from the eyepoint side to the object side measured along an optical centerline.

4. A magnification viewer as recited in claim 3 wherein the ratio of the diameter of the eyepiece lens to the objective lens is ⅔.

5. A magnification viewer having the design parameters represented in the following table:

| Element | $n_d$ | $v_d$ | Radius | Thickness | Separation |
|---|---|---|---|---|---|
| I | 1.517 | 64.2 | $R_1 = 28.12$<br>$R_2 = 28.12$ | $T_1 = 1.5$ | $S_1 = 13.97$ |
| II | 1.805 | 25.4 | $R_3 = 121.40$<br>$R_4 = 49.28$ | $T_2 = 1.5$ | |
| III | 1.607 | 56.7 | $R_4 = 49.28$<br>$R_5 = 27.50$ | $T_3 = 5.8$ | | wherein the Roman numeral I identifies the lens element of a single element eyepiece lens and the Roman numerals II and III identify two lens elements of an objective lens, from eyepoint side to object side; nd represents the refractive index of each element; $v_d$ is the Abbe dispersion number; R1–R5 represent the radii, in millimeters, of respective refractive surfaces, in order, from the eyepoint side to the object side; T1–T3 and S1 represent the thicknesses, in millimeters, of the lens elements and air spaces, respectively, from the eyepoint side to the object side measured along an optical centerline.

6. A magnification viewer system adapted to be carried by a pair of spectacles including at least one spectacle lens, and adapted to enable selection of one of a plurality of predetermined working distances, comprising;

a mounting barrel adapted to be carried by said spectacle lens with one end facing the spectacle lens;

a doublet objective lens mounted at the opposite end of the barrel;

a plurality of eyepiece lenses each having equiconcave surfaces adapted to be mounted in the one end of the barrel;

a first of said eyepiece lenses having a predetermined first radii of curvature, which provides a first of said working distances in conjunction with said objective lens when mounted in the one end of the barrel;

a second of said eyepiece lenses having a predetermined second radii of curvature, which provides a second of said working distances in conjunction with the objective lens when mounted in the one end of the barrel; and one of said first and second eyepiece lenses being mounted in the one end of said barrel to thereby provide the working distance associated with that one lens.

7. A magnification viewer according to claim 6 wherein said one end of said barrel is attached to the spectacle lens by insertion into said spectacle lens.

8. A magnification viewer according to claim 6 wherein said one end of said barrel attaches to the surface of said one spectacle lens.

9. A method for making magnification viewers of different working distances, comprising:

providing a plurality of equiconcave lenses, each having a different predetermined radii of curvature;

providing a lens barrel having two ends;

mounting in one end of the said lens barrel an objective lens having a predetermined radii of curvature; and selecting one of the eyepiece lenses and mounting it in the other end of said lens barrel to thereby establish a first of said working distances in conjunction with the objective lens;

selecting a second one of said eyepiece lenses and mounting it in said other end of the barrel instead of mounting the first one of said eyepiece lenses to establish a second working distance in conjunction with said objective lens.

10. A method according to claim 9, further comprising mounting an eyepiece end of said lens barrel at a surface of a spectacle lens.

11. A method according to claim 9, further comprising mounting said eyepiece end through a spectacle lens.

* * * * *